Aug. 18, 1953 C. E. DEARDORFF 2,649,115
PRESSURE-RESPONSIVE MECHANISM
Filed Jan. 26, 1948
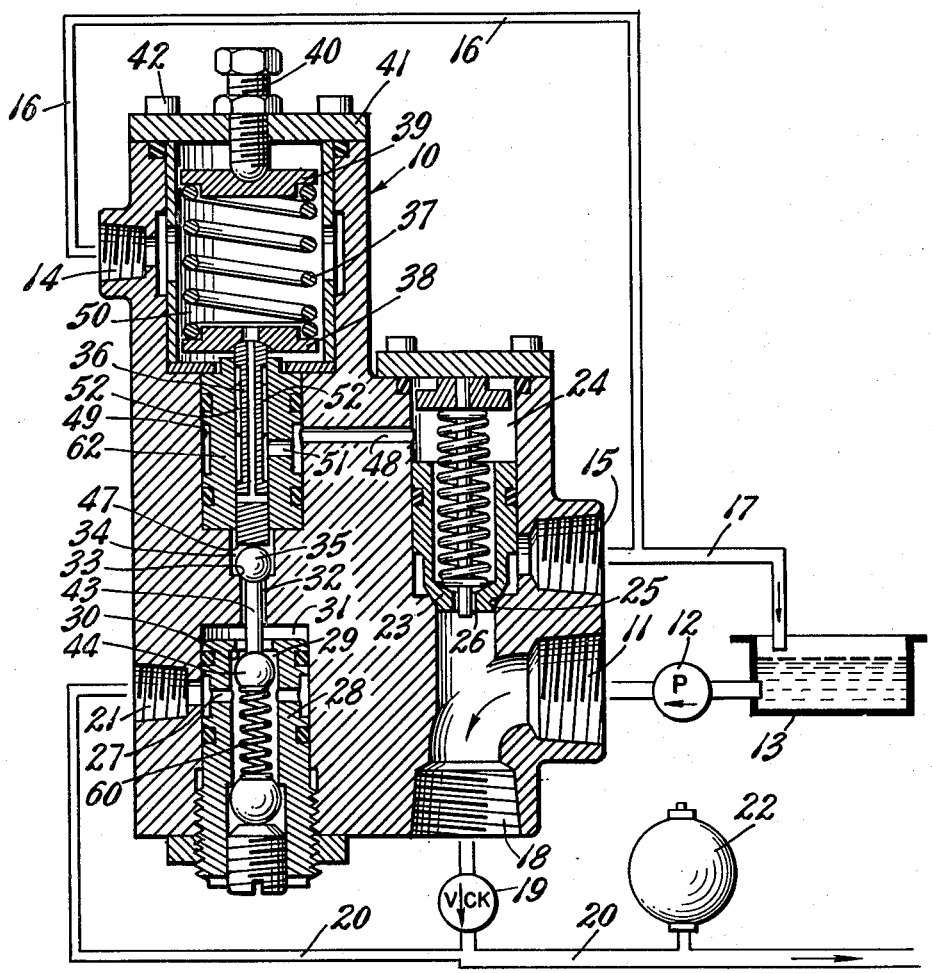
INVENTOR
CLINTON E. DEARDORFF
BY
ATTORNEY Patented Aug. 18, 1953

2,649,115

UNITED STATES PATENT OFFICE 2,649,115

PRESSURE-RESPONSIVE MECHANISM

Clinton E. Deardorff, San Fernando, Calif., assignor to Bendix Aviation Corporation, South Bend, Ind., a corporation of Delaware Application January 26, 1948, Serial No. 4,427

6 Claims. (Cl. 137—656)

This invention relates to hydraulic apparatus and particularly to pressure responsive devices such as relief valves, pressure regulators, etc., which are adapted to respond to changes from predetermined pressures.

In pressure responsive devices of the type referred to, it has been common practice to employ a piston to one end of which the pressure to be controlled is applied, an opposing force being applied to the piston by a spring. The piston will move in response to rise of the pressure above or drop of the pressure below a value sufficient to overcome the spring, if there is no frictional resistance to movement. However, difficulty has been encountered in successfully operating such devices, particularly at very high pressures, because it has been necessary to provide a packing on the piston, and the packing introduced relatively high frictional resistance to movement. One disadvantage of such friction is that it varies from time to time so that the piston cannot be relied upon to move always in response to the same predetermined pressure. Another serious objection to packed pistons is that the friction increases the range of pressure between that required to move the piston against the spring force and that which permits the spring to restore the piston.

A primary object of the present invention is to reduce the range of a pressure responsive mechanism.

Another object is to provide a pressure responsive mechanism in which the range can be readily adjusted.

Another object is to eliminate variations in the operating characteristics of a pressure actuated mechanism.

Another object is to provide a pressure-actuated device of the general type referred to in which the movable member has no packing and therefore has no appreciable frictional resistance to movement.

In accordance with the present invention the foregoing objects are achieved by employing an unpacked piston in combination with a pair of poppet valves and appropriate seating structures whereby fluid leakage is prevented by the poppet valves when the piston is in either end position, and leakage past the piston can occur only while the piston is moving between its end positions. Furthermore, the construction is such as to provide a snap action of the piston so that its period of movement and consequently the period when leakage can occur is very short.

Further in accordance with the invention, the pressure differential between the pressures required to institute movement of the piston in opposite directions can be readily adjusted to any desired value to satisfy varying requirements. When the device is employed in a pressure regulator, the pressure can be held to within as narrow a range as may be desired by easy adjustment of the mechanism.

A full understanding of the invention and the manner in which the aforelisted objects are obtained will be apparent from the following detailed description with reference to the drawing, in which the single figure shows the invention incorporated in a pilot type pressure regulating valve for a hydraulic power system.

Referring to the drawing, there is shown a pressure-regulating valve 10 incorporating the invention which valve has: an inlet port 11 adapted to be connected to the output of a pump 12, the input of the pump being connected to a reservoir 13; return ports 14 and 15 connected by ducts 16 and 17 to the reservoir 13; a main discharge port 18 connected through a check valve 19 to a main pressure line 20, and a control pressure port 21 which is connected directly to the line 20. In accordance with conventional practice, the pressure line 20 may have an accumulator 22 connected thereto for reducing the abruptness of pressure changes in the line. So long as the pressure in the line 20 remains below a predetermined value, for which the pressure regulator 10 is adjusted, the output of the pump 12 flows into the port 11 and out of the port 18 through the check valve 19 into the line 20. There is a restricted path for fluid flow through a passage 26 in a by-pass poppet 23 into a chamber 24. However, fluid cannot escape from the chamber 24, so the full pressure of the pump is developed therein and is exerted against the upper end of the poppet 23 holding the latter against its seat by virtue of the fact that the area of the upper end of the poppet is larger than the area of the seat 25 against which it seats.

The pressure of the fluid in the line 20 is also applied through the port 21 and passages 27 in a cage 28 to a central passage 29 therein and thence past a first valve seat 30 in the upper end of the cage 28 into a cylinder 31 in which the cage 28 is positioned. The passage 29 constitutes a first pressure chamber which is connected by the first seat 30, a passage 32, and a second valve seat 33 at the upper end of that passage with a second pressure chamber 34. However, under the conditions described, a ball poppet 35, hereinafter referred to as the second poppet, is held against the second seat 33 by a pressure-actuated slide member 36 which is urged downwardly by a helical compression spring 37, the lower end of the spring bearing against a disk 38 which in turn bears against the upper end of the member 36, and the upper end of the spring bearing against a disk 39 which bears against an adjusting screw 40 threaded in a closure plate 41, which is secured by screws 42 to the upper end of the body of the regulator.

When the pressure in the discharge line 20 rises above a value for which the spring-adjusting screw 40 is set, the pressure acting against the underside of the second poppet 35 overcomes the force of the spring 37 and lifts the poppet 35 off its seat 33. The line pressure is thereby applied to the second chamber 34 and to the lower end of the slide member 36. The area of the slide member 36 is made somewhat larger than the area of the seat 33, so that the pressure force acting against the spring 37 is increased when the poppet 35 lifts off the seat, causing resultant rapid upward travel of the slide member 36. A spring 60 causes the second poppet 35, a spacer 43, and a first poppet 44 to follow the slide member 36 until the poppet 44 seats against the first seat 30. The member 36 is held in its upper position until the pressure drops in the line 20, because the area of the first seat 30 is larger than the area of the pressure face 47 of the member 36, and hence the operation is not effected by leakage of fluid past the member 36 following seating of the first poppet 44 against the first seat 30.

In its upper position, the slide member 36 connects the chamber 24 with the return port 14, and the resultant pressure drop across the passage 26 in the poppet 23 is sufficient to open the latter and permit flow of the pump output through the return port 15 and the line 17 back to the reservoir 13, thereby unloading the pump. The path for fluid escape from the chamber 24 may be traced through a passage 48 into a cylinder 49, in which a liner 62 is positioned, through a radial passage 51 in the liner 62 and through grooves 52 in the slide member 36 into the spring chamber 50, and thence out through the port 14 and the line 16 and the line 17 back to the reservoir 13.

When the pressure in the line 20 drops below a predetermined value, the pressure force acting against the first poppet 44 is unable to overcome the force of the spring 37, and the latter moves the member 36, second poppet 35, spacer 43 and first poppet 44 downwardly. The opening of the poppet 44 permits the line pressure fluid to be applied through the passage 32 and the second chamber 34 to the pressure face 47, but this does not prevent continued downward movement of the member 36, since the area of the pressure face 47 is less than the area of the seat 30. Accordingly, the downward movement of the assembly continues rapidly until the second poppet 35 seats against the second seat 33. The downward movement of the member 36 blocks fluid flow from the chamber 24, so that the pressure builds up in that chamber and closes the poppet 23, to again force the output of the pump 12 out through the port 18 and the check valve 19 into the pressure line 20.

It is to be particularly noted that when the first poppet 44 is seated on the first seat 30, the spring 37 is compressed to a greater extent and exerts a greater force than when the second poppet 35 is seated on the second seat 33. Hence the area of the first seat 30 must be sufficiently greater than the area of the second seat 33 to overcome the greater force exerted by the spring 37 when it is more highly compressed. The variation in the spring force is a function of the distance through which it moves, and this distance can be adjusted by screwing the cage 28 in or out to thereby vary the distance between the seats 30 and 33, respectively.

Although for the purpose of explaining the invention, a particular embodiment thereof has been shown and described, obvious modifications will occur to a person skilled in the art, and I do not desire to be limited to the exact details shown and described.

I claim:
1. A pressure-actuated device comprising: means defining first and second pressure chambers interconnected by a passage; a first valve seat at the orifice of said passage in said first chamber and a second smaller valve seat at the orifice of said passage in said second chamber; poppet valve means comprising interconnected first and second poppets, said first poppet being in said first chamber and adapted to be urged against said first seat by pressure in said first chamber and said second poppet being in said second chamber and adapted to be urged away from said second seat by pressure in said first chamber, said poppet valve means being longer than the distance between said seats whereby only one of said poppets can seat at a time; a pressure-actuated slide member slidable between two positions and having a pressure face exposed to pressure in said second chamber whereby fluid pressure in said second chamber urges the member in one direction; the area of said pressure face being intermediate the areas of said first and second seats; spring means urging said member in the other direction; said slide member and said poppet valve means being mechanically interrelated for unseating said first poppet and seating said second poppet in response to movement of said slide member in said other direction.

2. Apparatus in accordance with claim 1 including means for varying the spacing between said first and second seats relative to the spacing between said first and second poppets.

3. A device according to claim 2 in which said means defining said first chamber comprises a cage longitudinally adjustable with respect to said second chamber.

4. A device according to claim 1 including casing means defining said passage and defining a cylindrical bore in alignment with and of substantially larger diameter than said passage; piston means movable longitudinally in said bore, said piston means having a cavity constituting said first chamber and having an orifice in the end thereof defining said first valve seat; and means for longitudinally adjusting said piston in said bore.

5. A device in accordance with claim 1 in which said poppet valve means comprises a pair of balls positioned within said first and second chambers respectively and a spacing element within said passage for unseating one ball in response to seating of the other ball.

6. A device as described in claim 1 in which said slide member constitutes a slide valve movable in said one direction into one end position and movable in said other direction into an opposite end position; and means cooperating with said slide valve for variably controlling flow of fluid in different longitudinal positions of said valve.

CLINTON E. DEARDORFF.

References Cited in the file of this patent

UNITED STATES PATENTS

| Number | Name | Date |
|---|---|---|
| 1,806,301 | LeValley | May 19, 1931 |
| 2,404,102 | Schultz | July 16, 1946 |
| 2,420,370 | Hamilton | May 13, 1947 |
| 2,447,820 | Schultz | Aug. 24, 1948 |